United States Patent [19]
Reppas

[11] Patent Number: 5,775,456
[45] Date of Patent: Jul. 7, 1998

[54] EMERGENCY DRIVER SYSTEM

[76] Inventor: George S. Reppas, 1030 San Raymundo Rd., Hillborough, Calif. 94010-6656

[21] Appl. No.: 464,525

[22] Filed: Jun. 5, 1995

[51] Int. Cl.$^6$ ...................................................... B62D 1/12
[52] U.S. Cl. ............................ 180/322; 180/90; 180/271; 180/286; 180/315; 180/323; 180/325; 200/43.16; 200/43.22; 200/333; 200/43.19; 307/10.1; 340/471
[58] Field of Search .................................. 180/271, 272, 180/322, 323, 325, 90, 315, 286; 296/70; 200/43.16, 43.22, 43.19, 333; 307/10.1, 10.2; 340/468, 471

[56] References Cited

U.S. PATENT DOCUMENTS

| | | |
|---|---|---|
| 1,013,473 | 1/1912 | Block . |
| 2,878,885 | 3/1959 | Hamm . |
| 2,912,082 | 11/1959 | Wooten, Jr. . |
| 3,049,188 | 8/1962 | Giannetti . |
| 3,313,110 | 4/1967 | Von Rohr ............................ 180/322 |
| 3,448,821 | 6/1969 | McGuire ............................. 180/90 |
| 3,824,538 | 7/1974 | Slemp . |
| 3,881,461 | 5/1975 | Filip . |
| 3,937,295 | 2/1976 | Wright . |
| 4,010,814 | 3/1977 | Adams . |
| 4,146,108 | 3/1979 | Sato . |
| 4,172,980 | 10/1979 | Hsieh et al. . |
| 4,209,075 | 6/1980 | Messina . |
| 4,234,051 | 11/1980 | Morris, Jr. . |
| 4,366,881 | 1/1983 | Frisbee . |
| 4,414,937 | 11/1983 | Ueda et al. . |
| 4,969,541 | 11/1990 | Lin . |
| 5,090,514 | 2/1992 | Wright . |
| 5,195,606 | 3/1993 | Martyniuk . |

FOREIGN PATENT DOCUMENTS 52-39287  3/1977  Japan ........................ 180/322

*Primary Examiner*—Eric D. Culbreth
*Attorney, Agent, or Firm*—Harness, Dickey & Pierce, P.L.C.

[57] ABSTRACT

Disclosed is an emergency driver system for a motor vehicle. The emergency driver system allows a passenger in the motor vehicle to safely maneuver the motor vehicle should the driver become incapacitated by exposing a brake actuator and an accelerator actuator concealed by a cover. Upon opening the cover, a cover sensor actuates emergency lights, headlights, and a horn, and disengages the operation of the driver brake pedal and accelerator pedal. This allows the passenger to control the steering with the left hand and the acceleration and braking of the motor vehicle with the right hand, via the brake actuator and the accelerator actuator positioned on an emergency control panel located under the cover.

21 Claims, 2 Drawing Sheets

EMERGENCY DRIVER SYSTEM

BACKGROUND OF THE INVENTION

1. Field of the Invention

This invention relates generally to an emergency driver system in a motor vehicle and, more particularly, to an emergency driver system which is operable by a passenger in the motor vehicle to enable the passenger to safely maneuver the motor vehicle should the driver become incapacitated during operation of the motor vehicle.

2. Discussion of the Related Art

There are various vehicle control devices known in the art for stopping a vehicle if the driver of the vehicle becomes incapacitated. For example, U.S. Pat. No. 5,195,606 discloses an emergency stopping apparatus for automobiles in which a panic button or switch is positioned within the easy reach of the passenger, as well as the driver. In the event that the driver is suddenly rendered incapacitated, the switch can be actuated by the passenger so that the automobile can be brought to a stop. Upon actuation of the single switch, the braking system of the automobile is activated, in addition to disabling the electrical ignition system of the automobile.

U.S. Pat. No. 5,090,514 discloses a safety device operable by a passenger in a motor vehicle which allows the passenger to stop the motor vehicle if the driver of the vehicle becomes incapacitated by actuating a single electrical switch. Upon actuation of the switch by the passenger, a brake circuit applies the brakes of the vehicle to stop the vehicle, an ignition circuit stops the vehicle engine and the emergency lights are activated.

U.S. Pat. No. 2,878,885 discloses an emergency brake device for a vehicle which is operable by a passenger independent of the controls operated by the driver for selectively turning off the engine, applying the brakes, disengaging the shift mechanism and turning off the fuel supply. Single pole switches are provided and located within the middle of the dashboard of the vehicle so that the driver and passenger of the vehicle can reach the switches in the event of an emergency or if the controls of the vehicle become inoperative. If the conventional controls become inoperative, the passenger or driver can actuate the single pole switches to turn off the fuel supply to the engine, turn off the ignition system and place the vehicle in low gear, while at the same time applying the brakes.

U.S. Pat. No. 1,013,473 discloses a vehicle brake that can be used in case of an emergency so that a passenger can stop the motor and actuate the brakes.

Upon actuation of a lever by the passenger, the brakes of the vehicle are applied, in addition to stopping the motor through the ignition. During this time, the driver can also operate another brake lever independent of the emergency brake apparatus.

Each of the above-identified devices can stop a vehicle in case of an emergency; however, each of the above-identified devices have several disadvantages. For instance, the auxiliary control switches or levers in the above-identified devices are readily accessible within the passenger compartment of the vehicle, thus leaving these controls prone to accidental or inadvertent use. Such a situation may occur if the passenger accidentally bumps or hits one of the switches thereby causing the vehicle to be stopped inadvertently and possibly under dangerous driving conditions, such as in heavy traffic. In addition, children within vehicles typically tend to play with various switches and buttons within the vehicle, thereby leaving the driver vulnerable to loss of control over the vehicle by a child accidentally or intentionally playing with the control switches.

Another disadvantage with the above-identified devices is that the devices merely disable the engine and simultaneously apply the brakes to stop the vehicle if the driver becomes incapacitated. However, by stopping the vehicle wherever the driver becomes incapacitated may cause other serious problems. For example, should the vehicle be traveling in heavy traffic when the driver becomes incapacitated, stopping the vehicle in such a situation in the center of heavy traffic may cause other vehicles in close proximity to strike this vehicle and other vehicles as well.

Another disadvantage with the above-identified devices relates to the conventional brake and accelerator controls of the driver. If the driver becomes incapacitated while accelerating or simply driving the vehicle, the driver's foot may become lodged on the accelerator pedal or the brake pedal, thereby causing the vehicle to lunge forward possibly striking other vehicles in close proximity or causing the vehicle to stop very suddenly.

What is needed then is an emergency driver system which does not suffer from the above-mentioned disadvantages. This will, in turn, eliminate the accidental and inadvertent actuation of the auxiliary controls, inhibit children from playing with the auxiliary controls, allow the vehicle to be maneuvered and not simply stopped, as well as disable the driver's brake and accelerator pedals should the driver become incapacitated. It is therefore, an object of the present invention to provide such an emergency driver system and method therefor.

SUMMARY OF THE INVENTION

In accordance with the teachings of the present invention, an emergency driver system for a motor vehicle is disclosed. The emergency driver system basically allows a passenger within the motor vehicle to control the acceleration and braking of the motor vehicle if the driver becomes incapacitated.

In one preferred embodiment, an accelerator controller controls the acceleration and deceleration of the motor vehicle and is responsive to a first accelerator actuator and a second accelerator actuator. A brake controller controls the brakes on the motor vehicle and is responsive to a first brake actuator and a second brake actuator. An emergency control panel positioned within reach of a passenger houses the second accelerator actuator and the second brake actuator. A cover conceals the second accelerator actuator and the second brake actuator positioned on the emergency control panel. A cover sensor senses the opening of the cover which exposes the second accelerator actuator and the second brake actuator and disables the first accelerator actuator and the first brake actuator. This allows the passenger to control acceleration and braking of the motor vehicle with the second accelerator actuator and the second brake actuator.

Use of the present invention provides a concealed accelerator actuator and a brake actuator operable to be used by the passenger in a motor vehicle if the driver of the motor vehicle becomes incapacitated. As a result, the aforementioned disadvantages associated with the other vehicle safety devices have been substantially eliminated.

BRIEF DESCRIPTION OF THE DRAWINGS

Still other advantages of the present invention will become apparent to those skilled in the art after reading the following specification and by reference to the following drawings in which.

DETAILED DESCRIPTION OF THE PREFERRED EMBODIMENT

The following description of an emergency driver system which enables a passenger to control the acceleration and braking of a motor vehicle is merely exemplary in nature and is in no way intended to limit the invention or its applications or uses.

Figure 1:
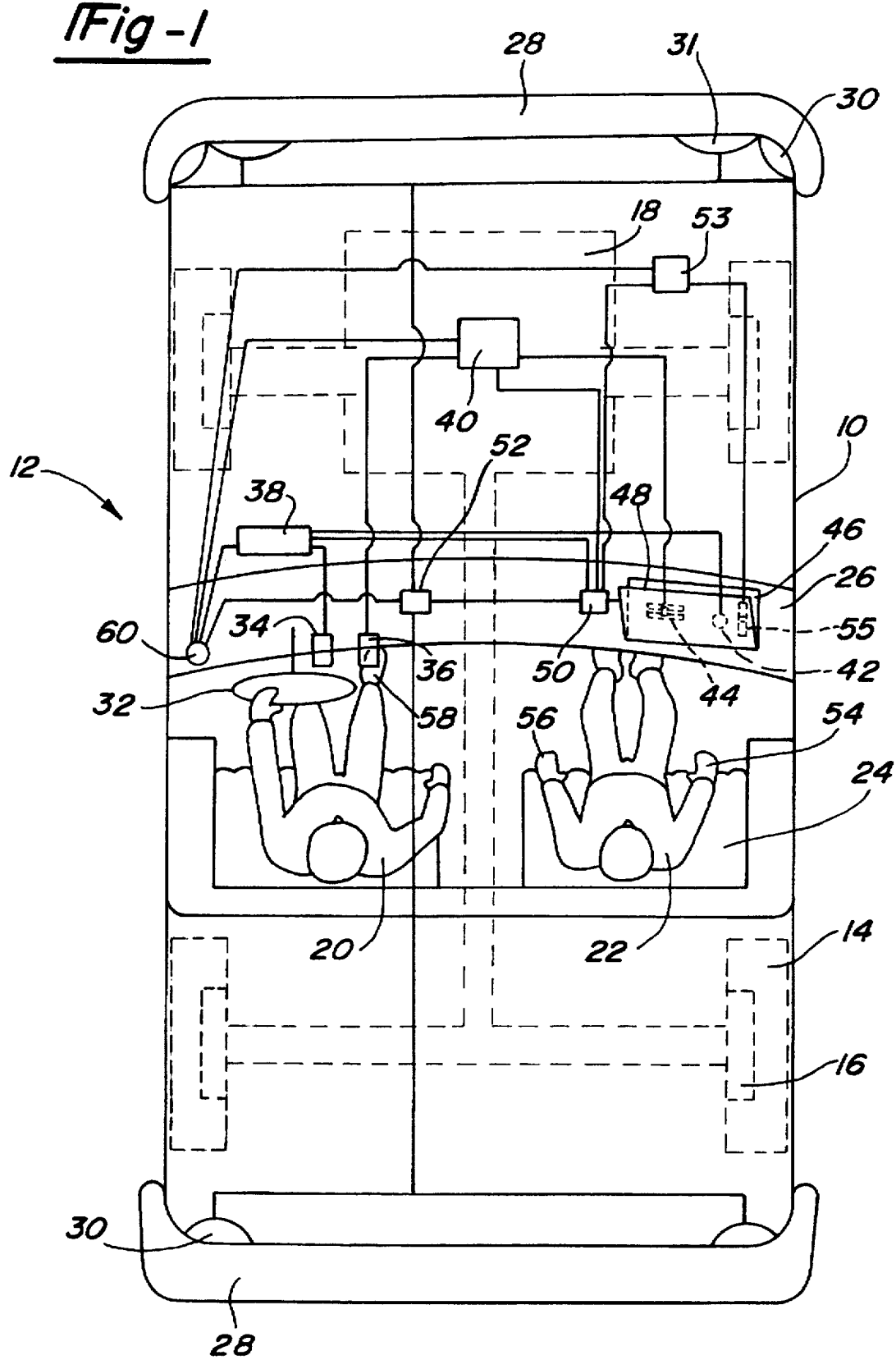
FIG. 1 is a cut-away block diagram of one preferred embodiment of the present invention implemented in a motor vehicle.

Referring to FIG. 1, a cutaway view of a motor vehicle 10 is shown which includes an emergency driver system 12. The motor vehicle 10 includes wheels 14 each having a brake mechanism 16 for stopping the vehicle 10 and an engine 18 for powering the vehicle 10. Positioned within the vehicle 10 is shown a driver 20 and a passenger 22 both seated on seats 24 facing a vehicle dashboard 26. Located to the front and rear of the vehicle 10 are bumpers 28, emergency or hazard lights 30 and headlights 31.

The driver 20 of the vehicle 10 maneuvers and controls the vehicle 10 using conventional controls, including a steering wheel 32, a brake actuator or pedal 34 and an accelerator actuator or pedal 36. When the brake pedal 34 is actuated by the driver 20, a brake controller 38 applies the brakes 16 to slow down and stop the vehicle 10. Upon movement of the brake pedal 34, the brake pedal 34 applies a variable analog signal to the brake controller 38 and the brake controller 38 applies the brakes 16 based on this movement. The brake pedal 34 and the brake controller 38 preferably use known automotive drive by wire technology and known brake controller technology to control the stopping of the vehicle 10.

Similarly, when the accelerator actuator or accelerator pedal 36 is actuated, an accelerator controller 40 controls the acceleration and deceleration of the vehicle 10, via the engine 18 and a conventional electronic fuel injection system (not shown). Upon movement of the accelerator actuator 36, the accelerator actuator 36 applies a variable analog signal to the accelerator controller 40 which controls the engine 18, via the electronic fuel injection system. Here again, the accelerator pedal 36 and the accelerator controller 40 preferably use known automotive drive by wire technology and known accelerator or engine control technology. Use of the steering wheel 32, the brake pedal 34 and the accelerator pedal 36 by the driver 20 allows the driver 20 to operate the motor vehicle 10 in a conventional fashion.

In addition to the brake actuator 34 and the accelerator actuator 36, the motor vehicle 10 includes a second auxiliary brake actuator or button 42 and a second auxiliary accelerator actuator or slide switch 44 positioned on an emergency control panel 46. The emergency control panel 46 is positioned centrally and in close proximity for right hand reach by the passenger 22 so that the passenger 22 can move to the left toward the steering wheel 32 and control the vehicle 10 if the driver 20 becomes incapacitated, as will discussed in more detail shortly. The brake actuator 42 and the accelerator actuator 44 positioned on the emergency control panel 46 are concealed by a cover 48 to prevent the accidental or inadvertent actuation of the brake or accelerator actuators 42 and 44.

The brake actuator 42 preferably consists of a button capable of providing a variable analog signal to the brake controller 38. Upon receipt of the variable analog signal, the brake controller 38 applies the brakes 16 in a manner substantially similar to when the brake pedal 34 is used by the driver 20 using the known drive by wire technology. The accelerator actuator 44 is preferably a slide mechanism or switch which also provides a variable analog signal to the accelerator controller 40 as the accelerator actuator 44 is slid from either the left to right or right to left. The variable analog signal allows the passenger 22 to control the acceleration and deceleration of the vehicle 10 in a manner substantially similar to when the driver 20 uses the accelerator pedal 36 using the known drive by wire technology.

A cover sensor 50 is used to detect and sense the opening of the cover 48. Upon opening the cover 48 to expose the brake actuator 42 and the accelerator actuator 44, the cover sensor 50 applies a signal to an emergency or hazard light actuator 52 to cause the emergency or hazard lights 30 and the headlights 31 to illuminate and flash. The emergency lights 30 flash off and on, while the headlights 31 alternately flash from right to left. In addition, the cover sensor 50 applies a pulsed signal to a conventional horn 53 mounted within the vehicle 10 to cause the horn 53 to intermittently sound. This provides both a visual and audible warning to drivers in close proximity to the vehicle 10 to indicate that there may be an emergency situation occuring. Should the passenger 22 wish to turn off the horn 53, an additional toggle switch 55 is positioned on the emergency control panel 46, where upon toggling the switch 55, the horn 53 will stop sounding. Still further, the cover sensor 50 applies an inhibit signal to the brake controller 38, as well as to the accelerator controller 40 to disable the inputs from the brake pedal 34 and accelerator pedal 36 using techniques well known in the art. This subsequently allows the passenger 22 to control the vehicle 10, via the brake actuator 42 and the accelerator actuator 44 with the passenger's right hand 54, while the passenger 22 steers the vehicle 10 with the left hand 56 using the steering wheel 32, as will be discussed in more detail shortly.

By disabling the brake pedal 34 and the accelerator pedal 36, this ensures that if the driver 20 becomes incapacitated and the driver's foot 58 is on either the accelerator pedal 36 or the brake pedal 34, the vehicle 10 will not be put out of control. Should the driver 20 regain consciousness, the driver 20 can actuate an interrupt button 60 located to the left of the steering wheel 32 on the dashboard 26. Upon actuation of the interrupt button 60, the operation of the brake actuator 42 and the accelerator actuator 44 are disabled and the operation of the brake pedal 34 and accelerator pedal 36 are enabled, via the brake controller 38 and the accelerator controller 40. In addition, the emergency or hazard lights 30 and the headlights 31 are extinguished, via the emergency actuator 52 and the horn 53 is disabled.

Figure 2:
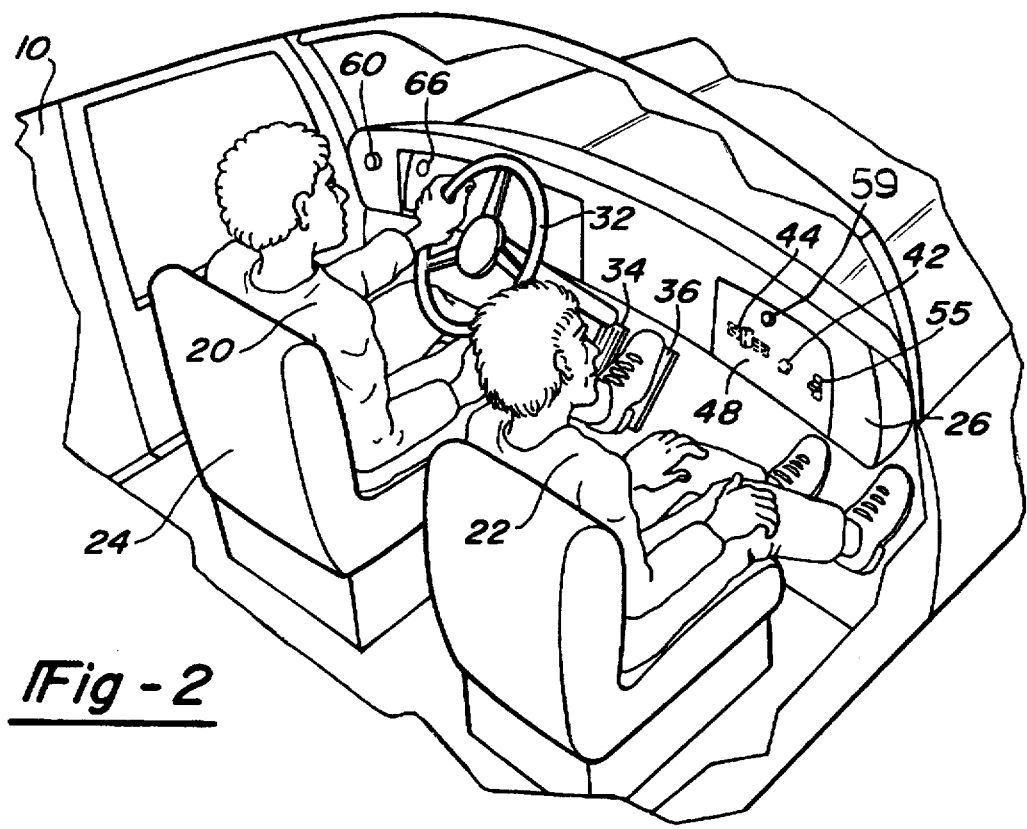
FIG. 2 is a perspective view of a driver and a passenger within the motor vehicle.
Figure 3:
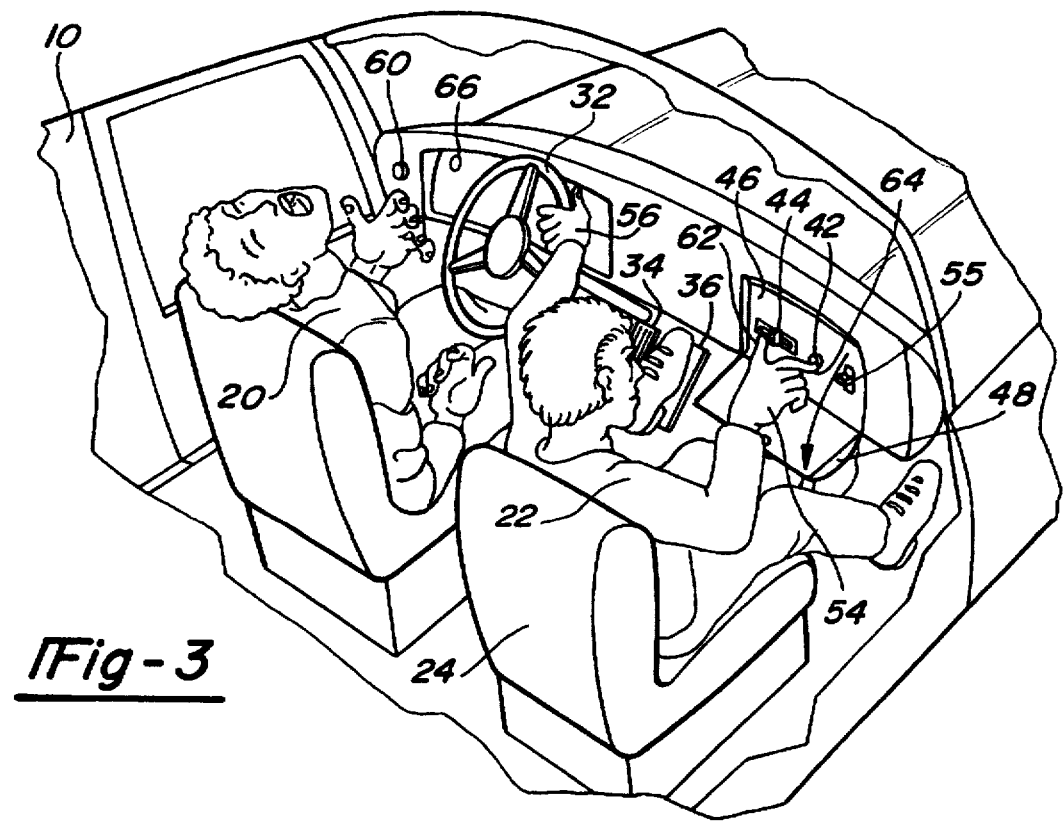
FIG. 3 is a perspective view of the passenger controlling the acceleration and braking of the motor vehicle while the driver is incapacitated.

Referring now to FIGS. 2 and 3, the operation of the emergency driver system 12 within the vehicle 10 will now be discussed in detail. As shown in FIG. 2, under normal driving conditions, the driver 20 controls the vehicle 10, via the steering wheel 32, the brake pedal 34 and the accelerator pedal 36 in a conventional manner. During this time, the passenger 22 is normally seated in the seat 24 and the brake actuator 42 and the accelerator actuator 44 are both concealed by the cover 48. The cover 48 conceals the brake actuator 42 and the accelerator actuator 44 to prevent the inadvertent or accidental operation of these actuators 42 and 44 which can be caused by the passenger 22 bumping or striking the exposed actuators 42 and 44 or by children merely playing within the vehicle 10. It should be noted that the emergency control panel 46 is shown positioned on the dashboard 26 in close proximity to the passenger 22 so that the brake actuator 42 and the accelerator actuator 44 are in close operating range of the right hand 54 of the passenger 22. In addition, the emergency control panel 46 is positioned in close proximity to the steering wheel 32 to allow steering control with the left hand 56 of the passenger 22. One skilled in the art would further recognize that the emergency control panel 46 can be positioned at other locations in close proximity to the passenger 22 and the steering wheel 32, such as in a center console or in a headliner.

Should the driver 20 become incapacitated, such as by a heart attack or a seizure, shown in FIG. 3, the passenger 22 would quickly open the cover 48 by pushing a release button 59 or other conventional locking mechanism to expose the concealed brake actuator 42 and the accelerator actuator 44. Upon opening the cover 48 of the emergency control panel 46, the cover sensor 50 will simultaneously activate the emergency flasher actuator 52 causing the emergency lights 30 and the headlights 31 to illuminate and flash, cause the horn 53 to intermittently sound, as well as disable the operation of the brake pedal 34 and the accelerator pedal 36 to the brake controller 38 and the accelerator controller 40. By disabling the operation of the brake pedal 34 and the accelerator pedal 36, this ensures that if the driver 20 becomes incapacitated with the driver's foot 58 positioned on the accelerator pedal 36 or the brake pedal 34, shown in FIG. 3, this does not cause the vehicle 10 to go out of control.

Once the cover 48 is opened, the passenger 22 grasps the steering wheel 32 using the left hand 56 while controlling the acceleration and braking of the vehicle 10 with the right hand 54, via the brake actuator 42 and the accelerator actuator 44. The acceleration can be controlled by the passenger's thumb 62, while the braking can be controlled by the passenger's index finger 64. It can be appreciated by those skilled in the art that the brake actuator 42, shown as a push button, and the accelerator actuator 44, shown as a slide mechanism, could also consist of various other actuators such as levers, push/pull actuators, or knobs.

By providing both acceleration and braking control to the passenger 22, the passenger 22 can do more than merely stop the vehicle 10, which could cause a dangerous condition if the vehicle 10 is traveling in heavy traffic. This ultimately enables the passenger 22 to maneuver the vehicle 10 using the brake actuator 42 and the accelerator actuator 44 in combination with the steering wheel 32. The passenger 22 can then maneuver the vehicle 10 through traffic and to the side of the road in a safe manner, thereby avoiding a collision with other vehicles in close proximity to the vehicle 10. This also allows the passenger 22 to maneuver or drive the vehicle 10 to a location where the driver 20 could receive medical assistance.

Should the driver 20 regain consciousness, the driver 20 could then merely actuate the interrupt button 60 positioned to the left of the steering wheel 32 away from the passenger's reach. This will provide the driver 20 with control of the vehicle 10 by enabling the operation of the brake pedal 34 and the accelerator pedal 36, while concurrently disabling the brake actuator 42 and the accelerator actuator 44, in addition to extinguishing the emergency flashers 30 and headlights 31, as well as disabling the horn 53. Should the passenger have to again operate the vehicle 10, the passenger 22 would merely close the cover 48 and again open the cover 48 thereby going through the same sequence of disabling the operation of the brake pedal 34 and accelerator pedal 36.

Moreover, it should be noted that upon starting the vehicle 10, a diagnostic operation is performed on the emergency driver system 12 to ensure that the emergency driver system 12 is operating properly. If it is not operating properly, a light 66 positioned on the dashboard 26 will be turned on to let the driver 20 know that the emergency driver system 12 needs servicing. This diagnostic operation is performed using conventional diagnostic techniques known in the art.

The foregoing discussion discloses and describes merely exemplary embodiments of the present invention. One skilled in the art would readily recognize from such a discussion, and from the accompanying drawings and claims, that various changes, modifications and variations can be made therein without departing from the spirit and scope of the invention as defined by the following claims.

What is claimed is:

1. An emergency driver system for a motor vehicle, said system comprising:

a first controller, said first controller being responsive to a first actuator and a second actuator and operable to control a first operation of said motor vehicle;

a cover, said cover concealing said second actuator; and a cover sensor, said cover sensor operable to sense the opening of said cover to expose said second actuator, wherein upon opening said cover, said cover sensor disables the operation of said first actuator.

2. The emergency driver system as defined in claim 1, further comprising a second controller, said second controller being responsive to a third actuator and a fourth actuator and operable to control a second operation of said motor vehicle, said fourth actuator concealed by said cover, wherein upon opening said cover, said cover sensor further disables the operation of said third actuator.

3. The emergency driver system as defined in claim 2, wherein said first controller is an accelerator controller and said first actuator is an accelerator pedal, and wherein said second controller is a brake controller and said third actuator is a brake pedal.

4. An emergency driver system as defined in claim 3, further comprising:

an emergency light actuator for illuminating a plurality of emergency lights; and a horn, wherein said cover sensor is operable for actuating said emergency light actuator and said horn for providing visual and audible warning.

5. An emergency driver system for a motor vehicle, said system comprising:

accelerator control means for controlling the acceleration and deceleration of the motor vehicle, said accelerator control means responsive to a first accelerator actuator and a second accelerator actuator;

brake control means for controlling brakes on the motor vehicle, said brake control means responsive to a first brake actuator and a second brake actuator;

an emergency control panel positioned within reach of a passenger, said second accelerator actuator and said second brake actuator positioned on said emergency control panel;

a cover concealing said second accelerator actuator and said second brake actuator positioned on said emergency control panel; and a cover sensor means for sensing the opening of said cover to expose said second accelerator actuator and said second brake actuator, wherein upon opening said cover, said cover sensor means disables the operation of said first accelerator actuator and said first brake actuator, whereby said passenger can control the acceleration and braking of the motor vehicle with said second accelerator actuator and said second brake actuator.

6. The emergency driver system as defined in claim 5, wherein said first accelerator actuator is an accelerator pedal and said first brake actuator is a brake pedal.

7. The emergency driver system as defined in claim 5, wherein said second accelerator actuator is a slide switch and said second brake actuator is a button.

8. The emergency driver system as defined in claim 5, wherein said emergency control panel is positioned on a vehicle dashboard adjacent to the passenger and a steering wheel.

9. The emergency driver system as defined in claim 5, further comprising an emergency light actuator for illuminating a plurality of emergency lights, said emergency light actuator responsive to said cover sensor means for illuminating said plurality of emergency lights upon said cover sensor means sensing the opening of said cover.

10. The emergency driver system as defined in claim 5, further comprising an interrupt means for enabling the operation of said first accelerator actuator and said first brake actuator and disabling the operation of said second accelerator actuator and said second brake actuator.

11. The emergency driver system as defined in claim 5, further comprising a horn and a horn interupt switch, wherein upon opening said cover, said cover sensor means causes said horn to sound, and wherein upon activating said horn interupt switch, said horn stops sounding.

12. The emergency driver system as defined in claim 5, further comprising a warning indicator for indicating when said emergency driver system is not functioning properly.

13. An emergency driver system for a motor vehicle, said system comprising:

an accelerator controller, said accelerator controller being responsive to an accelerator pedal and an accelerator actuator and operable to control the acceleration and deceleration of the motor vehicle;

a brake controller, said brake controller being responsive to a brake pedal and a brake actuator and operable to control the brakes on the motor vehicle;

an emergency control panel, said emergency control panel positioned on a dashboard of the motor vehicle and within reach of a passenger, said accelerator actuator and said brake actuator positioned on said emergency control panel;

a cover, said cover concealing said accelerator actuator and said brake actuator positioned on said emergency control panel;

an emergency light actuator, said emergency light actuator operable to illuminate a plurality of emergency lights positioned on the motor vehicle; and a cover sensor, said cover sensor operable to sense the opening of said cover to expose said accelerator actuator and said brake actuator, wherein upon opening said cover, said cover sensor disables the operation said accelerator pedal and said brake pedal and enables said emergency light actuator to illuminate said plurality of emergency lights, whereby said passenger can control the acceleration and braking of the motor vehicle with said accelerator actuator and said brake actuator.

14. The emergency driver system as defined in claim 13, wherein said accelerator actuator is a slide switch and said brake actuator is a button.

15. The emergency driver system as defined in claim 13, further comprising an interrupt button positioned within reach of a driver of the motor vehicle, said interrupt button operable to enable the operation of said accelerator pedal and said brake pedal and disable the operation of said accelerator actuator and said brake actuator.

16. The emergency driver system as defined in claim 15, wherein said interrupt button is positioned on the dashboard of the motor vehicle to the left of a steering wheel.

17. The emergency driver system as defined in claim 13, further comprising a horn, wherein upon opening said cover, said cover sensor actuates said horn to cause said horn to sound.

18. A method for controlling and operating a motor vehicle with an auxiliary accelerator actuator and an auxiliary brake actuator positioned on an emergency control panel and concealed with a cover in case of an emergency, said method comprising the steps of:

operating said motor vehicle with an accelerator pedal and a brake pedal;

opening said cover to expose said auxiliary accelerator actuator and said auxiliary brake actuator during an emergency;

sensing the opening of said cover with a cover sensor;

disabling the operation of said accelerator pedal and said brake pedal upon sensing the opening of said cover with said cover sensor; and controlling the acceleration and braking of said motor vehicle with said auxiliary accelerator actuator and said auxiliary brake actuator upon disabling the operation of said accelerator pedal and said brake pedal with said cover sensor.

19. The method as defined in claim 18, wherein the step of sensing the opening of said cover further includes the step of illuminating a plurality of emergency lights on said vehicle upon sensing the opening of said cover.

20. The method as defined in claim 18, wherein the step of sensing the opening of said cover further includes the step of actuating a horn on said vehicle upon sensing the opening of said cover.

21. The method as defined in claim 18, wherein the step of controlling the acceleration and braking of the motor vehicle further includes the step of maneuvering the motor vehicle with said auxiliary accelerator actuator and said auxiliary brake actuator and a steering wheel to bring said motor vehicle to a stop.

* * * * *

UNITED STATES PATENT AND TRADEMARK OFFICE
CERTIFICATE OF CORRECTION

PATENT NO. : 5,775,456
DATED : July 7, 1998
INVENTOR(S) : George S. Reppas

It is certified that error appears in the above-indentified patent and that said Letters Patent is hereby corrected as shown below:

On the Title Page, under Inventor, "Hillborough" should be -- Hillsborough --.

Signed and Sealed this

Eighth Day of December, 1998

Attest:

BRUCE LEHMAN

Attesting Officer

Commissioner of Patents and Trademarks